United States Patent [19]
Gehman

[11] 3,731,305
[45] May 1, 1973

[54] OBJECT DETECTION SYSTEM USING ELECTRO MAGNETIC WAVES

[75] Inventor: John B. Gehman, San Diego, Calif.

[73] Assignee: General Dynamics Corporation, San Diego, Calif.

[22] Filed: Dec. 9, 1971

[21] Appl. No.: 210,264

[52] U.S. Cl. .................................. 343/5 PD, 343/7.7
[51] Int. Cl. ............................................... G01s 9/42
[58] Field of Search ........................... 343/5 PD, 7.7; 181/.5 R, .5 AC

[56] References Cited

UNITED STATES PATENTS

| 3,680,098 | 7/1972 | Harris et al. | 343/5 PD |
| 3,432,855 | 3/1969 | Kalmus | 343/7.7 |
| 3,046,548 | 7/1962 | Briskin | 343/7.7 |

Primary Examiner—Benjamin A. Borchelt
Assistant Examiner—G. E. Montone
Attorney—Martin LuKacher

[57] ABSTRACT

Objects such as personnel and vehicles are detected when they enter a sensing field produced by an antenna which is excited by oscillators operating in the VHF frequency band by producing cyclic variations in the frequency and in the amplitude of the oscillators exciting signal, which variations are in approximately quadrature phase relationship. The system responds to the correlation between the amplitude and the phase variation so as to produce an alarm indication of both the presence of an intruding object and its direction of movement, either toward or away from sensing the antenna.

32 Claims, 8 Drawing Figures

INVENTOR.
JOHN B. GEHMAN

Patented May 1, 1973

INVENTOR.
JOHN B. GEHMAN

BY

ATTORNEY

Patented May 1, 1973
3,731,305
4 Sheets-Sheet 3
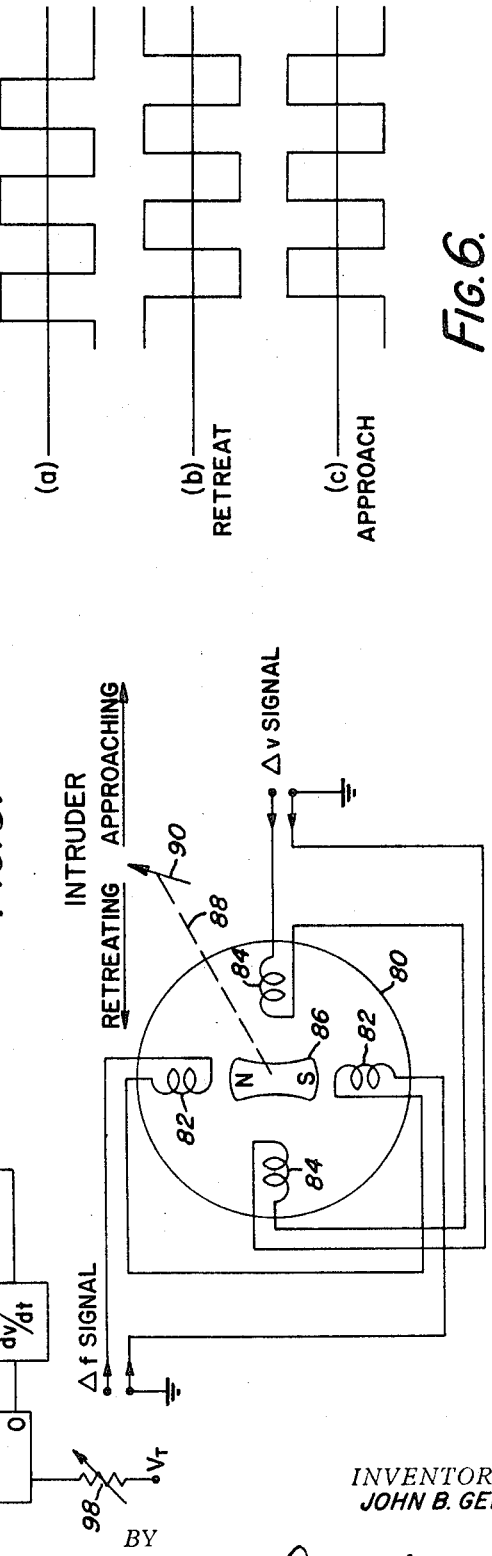
Fig. 6.
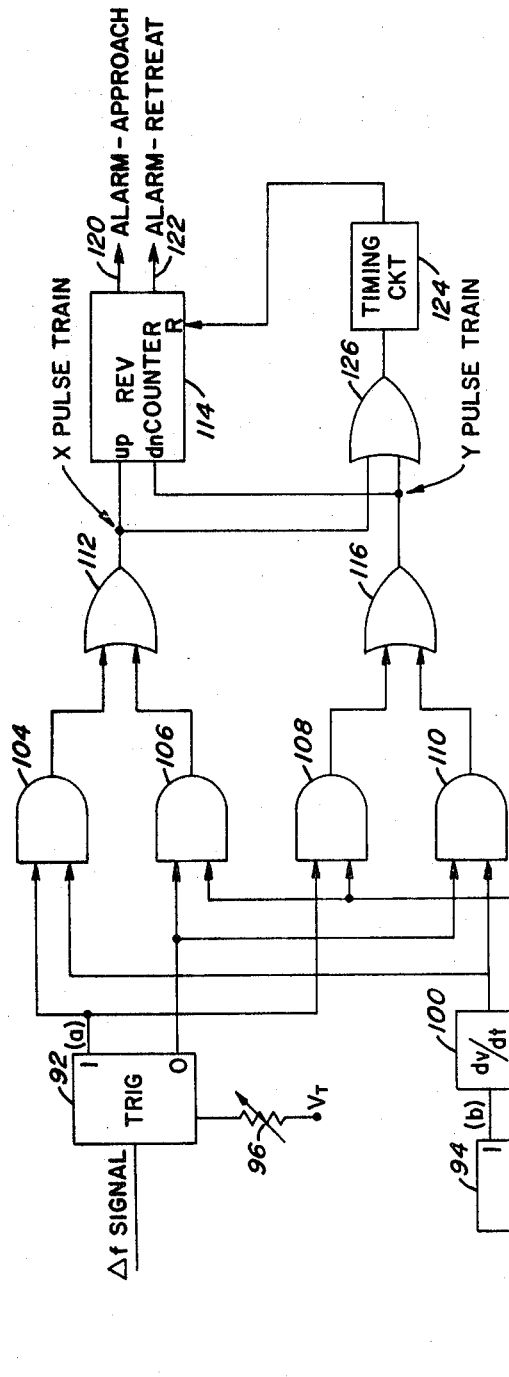
Fig. 5.
Fig. 4.
INVENTOR.
JOHN B. GEHMAN
BY
ATTORNEY

INVENTOR.
JOHN B. GEHMAN

OBJECT DETECTION SYSTEM USING ELECTRO MAGNETIC WAVES

The present invention relates to object detection systems and more particularly to a system which senses objects intruding into an area secured by an electro-magnetic field established in the area.

The invention is especially suitable for use in intrusion detection systems which are unobtrusive such that an intruder will not be aware that his presence is being detected.

U.S. Pat. No. 3,550,106 issued Dec. 22, 1970, in the name John B. Gehman describes an electro-magnetic sensing system which detects objects due to perturbations in an electro-magnetic sensing field established by a whip antenna. This field is perturbed by an intruding object which causes the difference in frequency between the frequencies of two oscillators, the frequencies of which are offset from each other, to vary cyclically as the object traverses the sensing field. It has been discovered in accordance with the present invention that the amplitude of the exciting signals also varies cyclically as the object enters the field. The amplitude variation, however, has been found to be in quadrature phase relationship with the frequency variations of the oscillators. Moreover, the quadrature phase relationship of the frequency and amplitude signals when the object is approaching the antenna or other device which establishes the sensing field is out of phase (180°) with the phase relationship of the variations when the object is moving away from or retreating from the antenna or other field establishing device. By virtue of this discovery improved object detection systems can be provided in accordance with the present invention which respond, not only to the presence of an object, but also to the direction in which the object is moving. The 180° out of phase relationship, depending upon the direction of movement of the object, affords a greater degree of discrimination against false alarms than can be provided by systems which respond to frequency deviation alone. Inasmuch as a principal source of false alarms is due to oscillating subjects, such as foliage swaying in the breeze, the reliability of an improved system provided in accordance with the invention is enhanced. Inasmuch as an additional signal parameter due to perturbations in a sensing field produced by an intruding object, is utilized in accordance with the invention, the sensitivity of the system is also increased.

Accordingly, it is an object of the present invention to provide an improved object detection system which utilizes electro-magnetic waves for sensing objects and other targets.

It is another object of the present invention to provide an improved electro-magnetic object detection system which has improved discrimination against false alarms.

It is a further object of the present invention to provide an improved electro-magnetic sensing system which has greater sensitivity to intruding objects than heretofore provided in object detection systems of the electro-magnetic type.

It is a still further object of the present invention to provide an improved object detection system which has increased sensitivity to intruding objects even in the presence of noise.

It is a still further object of the present invention to provide an improved electro-magnetic object detection system which affords a reduction in false alarms due to oscillating objects such as foliage.

It is a still further object of the present invention to provide an improved electro-magnetic object detection system which is responsive to the direction of movement of an intruding object and which can be adapted to indicate the direction of motion as well as the presence of the object.

Briefly described, an object detection system embodying the invention includes an antenna, such as the unobtrusive whip antenna which may be disguised to be part of the local vegetation as mentioned in the above referred to patent, for establishing a sensing field. An electro-magnetic signal generator, such as an oscillator, is coupled to the antenna for exciting the antenna to radiate the sensing field. The frequency of the exciting signal, such as the frequency of the oscillator, is detected, as by means of a frequency discriminator to produce a first output which vary cyclically in amplitude as an object in the field approaches or retreats from the antenna. The amplitude of the exciting signals is also detected, as by an envelope detector which is coupled to the line which couples the oscillator to the antenna. This detector produces a second output which varies in approximately quadrature phase relationship with the first output and having a phase progression as the object approaches or retreats from the antenna. The presence of the object as well as its direction of movement with respect to the antenna is indicated by correlating means which correlates the first and second output with each other. This correlating means may for example be a two phase servo motor, the shaft of which will rotate when an object enters the field. The rotation will be in a direction corresponding to the direction of movement of the object with respect to the antenaa. Foliage moving in a gusty wind generally oscillates such that an indicator attached to the shaft will move back and forth rather than continually in the same direction. Thus, false alarms due to foliage and other noise which may randomly be detected together with the output signals may be discriminated against. Other systems for processing the first and second outputs may be provided which are operative to correlate these signals and thereby indicate the presence and direction of movement of the intruding object.

The invention itself, both as to its organization and method of operation, as well as additional object and advantages thereof will become more readily apparent from a reading of the following description in connection with the accompanying drawings in which:

FIG. 4 is a schematic diagram of a servo motor which may be part of the system shown in FIGS. 2 or 3 which correlate the output signals provided by the portion of the system shown in FIGS. 2 and 3 so as to indicate the presence and direction of movement of an intruding object;

FIG. 5 is a block diagram of a system which may be utilized with the systems shown in FIGS. 2 and 3 for correlating the output signals thereof and indicating the direction of movement and the presence of an intruding object;

FIG. 6 is a family of waveforms which illustrates the operation of the system shown in FIG. 5;

Figure 1:
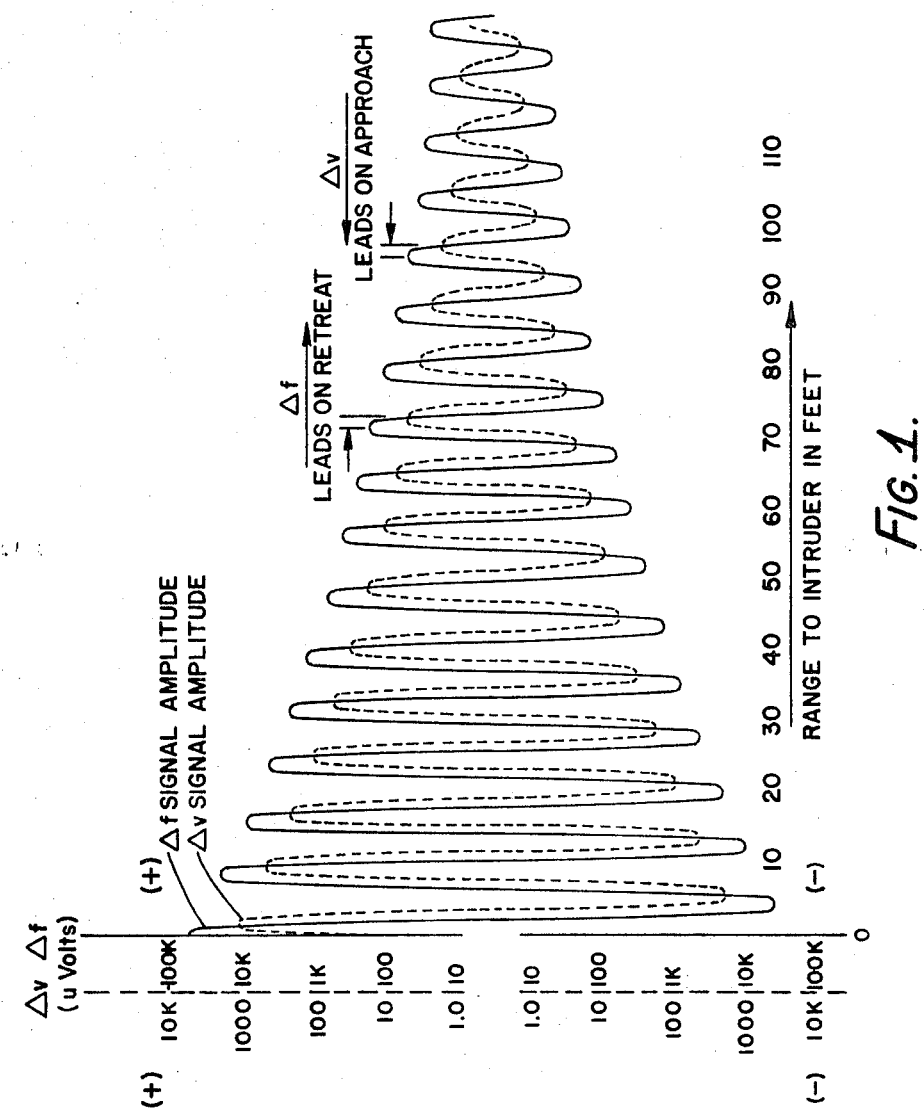
FIG. 1 are curves depicting the frequency variation and the amplitude variation of the exciting signal as an intruding object moves in the sensing field established by an antenna which forms part of a system provided by the invention.

As mentioned in the above referenced patent a cyclical frequency shift will occur in an exciting signal which generates a sensing electro-magnetic field by driving an antenna which establishes that field. This frequency shift signal varies cyclically depending upon the range of the intruding object to the antenna. Thus with an exciting frequency of approximately 60 $MH_z$ the frequency shift signal recycles every 8 feet. The signal recycles approximately every 4 feet for an exciting signal of approximately 120 $MH_z$. This frequency shift signal is represented in FIG. 1 as the $\Delta f$ signal amplitude and is shown in the solid line curve. The manner in which this signal is generated and detected will be discussed in detail hereinafter in connection with FIGS. 2 and 3. Suffice it to say at this point that the signal is a voltage amplitude, which in a typical case has a peak variation of approximately 100,000 microvolts when the object is close to the antenna; decreasing to approximately 10 microvolts at ranges in excess of 60 feet from the antenna. The rate at which the $\Delta f$ signal amplitude varies will be a function of the speed of movement of the object through the sensing field.

It has been discovered in accordance with the invention that the amplitude of the exciting signal also manifests a cyclic variation similar to the variation of the frequency shift. The amplitude variation is shown in FIG. 1 by the dash line curve designated the $\Delta v$ signal amplitude. It will be noted that the amplitude variation signal is in quadrature phase relationship (90° out of phase) with the $\Delta f$ signal amplitude FIG. 1 shows the relationship of $\Delta f$ and $\Delta v$ signal amplitudes with respect to range and can be used to determine the actual phase relationship between the signals when an object is approaching or retreating from the antenna. For example an approach, e.g., 110 ft. to 50 ft., shows that the $\Delta v$ signal leads the $\Delta f$ signal. For a retreat, e.g., 50 ft. to 110 ft., shows that the $\Delta f$ signal leads the $\Delta v$ signal. In other words, the $\Delta f$ signal is at 90° on approach and 270° on retreat with respect to the $\Delta v$ signal.

Figure 2:
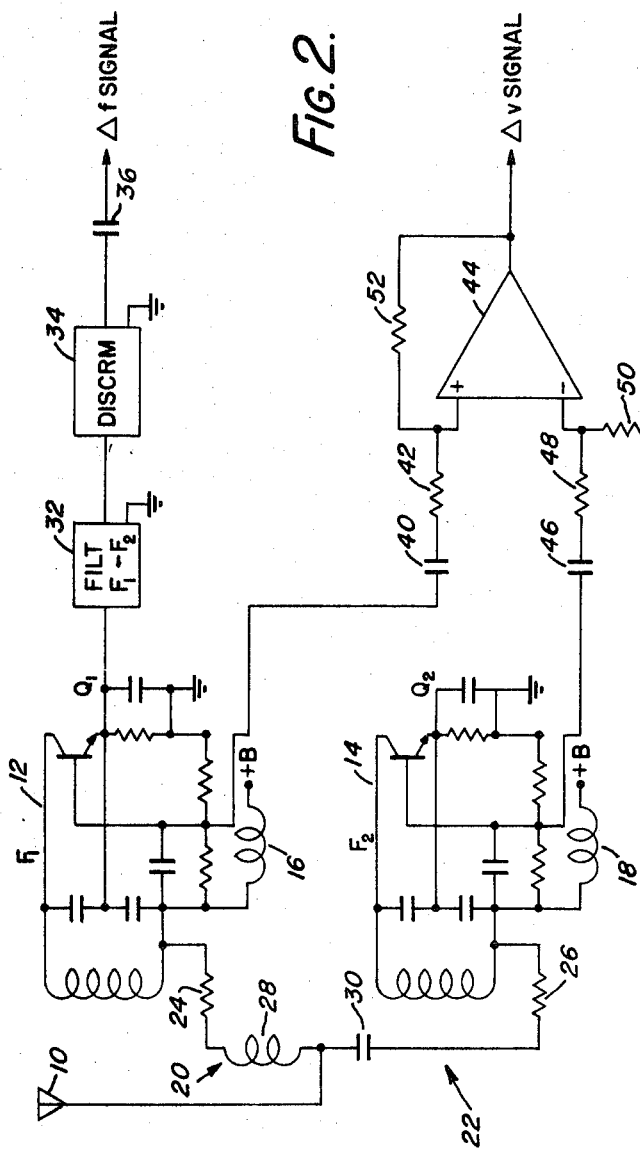
FIG. 2 is a schematic diagram showing a portion of an object system provided in accordance with the invention.
Figure 3:
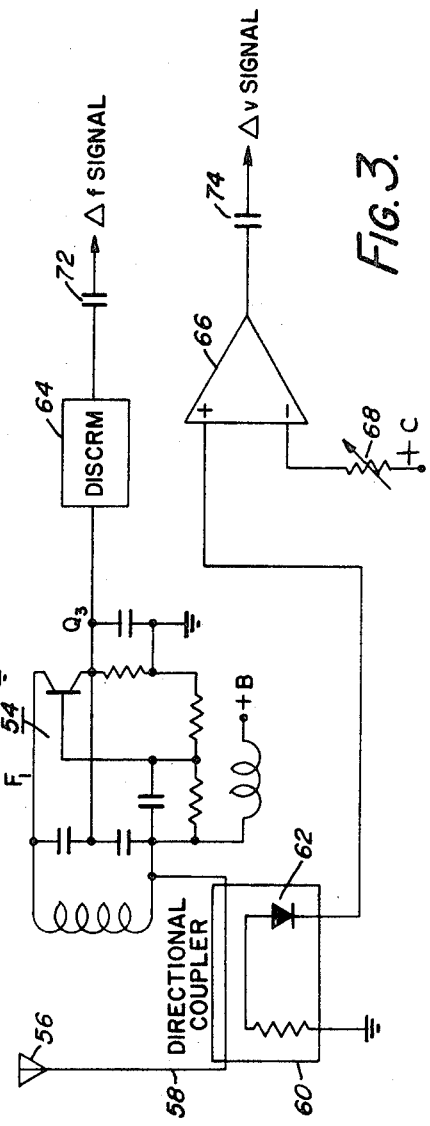
FIG. 3 is a schematic diagram of a portion of an object detection system provided in accordance with another embodiment of the invention.

As noted in FIG. 1 the $\Delta v$ signal amplitude when detected in accordance with the detection means to be described hereinafter in connection with FIGS. 2 and 3 is somewhat lower than the $\Delta f$ signal amplitude.

Referring now to FIG. 2, there is shown an antenna 10 which may be of the type described in the above referenced patent. The antenna 10 is excited by a first signal generating means shown as an oscillator 12 and also by a second frequency generating means shown as another oscillator 14. The frequencies of these oscillators, indicated as $F_1$ and $F_2$, may suitably be 57.5 $MH_z$ and 60 $MH_z$ respectively. The oscillators are essentially of the Colpitts type. Operating voltage for the oscillators is supplied from sources indicated as +B through chokes 16 and 18 which prevent the signals generated from the oscillator from being loaded by the power supplies. The oscillators 12 and 14 are otherwise similar to the oscillators described in the above referenced patent. In order to apply the signals generated by the oscillators to the antenna 10, coupling circuits 20 and 22 are used. These coupling circuits include isolation resistors 24 and 26. The coupling circuit 20 also includes an inductor 28 which tunes the antenna to the frequency $F_1$ of the oscillator 12. The higher frequency oscillator 14 is similarly tuned by a capacitor 30 in the coupling circuit 22. The coupling circuits are designed so that the oscillators do not lock to the same frequency. The coupling circuits may also include LC resonant circuits which constitute traps tuned to the frequency of the opposing oscillator (viz., a trap in coupling circuit 20 will be tuned to $F_2$ while the trap in coupling circuit 22 is tuned to $F_1$).

As explained in the above referenced patent, when an intruder enters the sensing field the frequency of oscillation of the oscillators 12 and 14 shifts in opposite directions thereby generating a frequency differential or beat frequency signal which may be extracted from either of the oscillator circuits. The coupling circuits 20 and 22, are operative to decouple the oscillators from each other. Enough of the signal from one oscillator to enter the oscillator circuit of the other oscillator, in addition to the miscellaneous coupling due to the close proximity of the circuits allows these signals to demodulate in the oscillator circuit. Extraction of the frequency differential signal at the emitter of one of the oscillators, say the emitter of the transistor in oscillator 12, is preferred. A filter circuit 32 tuned to the frequency differential ($F_1 - F_2$) but having sufficient bandwidth to pass the frequency variations in the frequency differential signal, is connected to the emitter of the transistor in the oscillator 12. The band-width of the filter 32 may suitably be ± 100 $KH_z$ operating at about 2.5 $MH_z$. The output of the filter is applied to a discriminator 34 which produces an amplitude variation which is the analog of the $\Delta f$ signal. This amplitude analog of the $\Delta f$ signal varies cyclically as shown in FIG. 1. In other words, if the normal frequency differential, assuming no intruder in the sensing field ($F_1 - F_2$) is 2.5 $MH_z$, then the $\Delta f$ signal will vary in amplitude in one polarity when the frequency shifts below 2.5 $MH_z$ and in the opposite polarity when the frequency shifts above 2.5 $MH_z$. In the event that only the rate of change of the $\Delta f$ signal amplitude is desired (removal of any direct current component thereof), a capacitor 36 may be inserted in the output of the discriminator 34. Inclusion of the coupling capacitor 36 is preferred inasmuch as environmental effects, say temperature, which may shift the direct current amplitude of the $\Delta f$ signal are thereby eliminated together with their attendant false alarm effects.

The signal representing the amplitude variations (the $\Delta v$ signal as shown in FIG. 1) is obtained by monitoring the RF signal generated in each oscillator, detecting the signals so as to provide signals which vary in accordance with the envelope of the RF and obtaining the difference therebetween. As shown in FIG. 2, the amplitude signals are monitored at the bases of the transistors $Q_1$ and $Q_2$ in the oscillators 12 and 14 respectively. The base junction of the transistors provides rectifying action such that the amplitude of the RF signals generated in each oscillator, as affected and varied by the presence of an intruding object, are detected. The envelope detected signal from the oscillator 12 is applied by way of a coupling and filtering capacitor 40 and a resistor 42 to the direct input of an operational amplifier 44. This operational amplifier has an inverting input to which the envelope detected signal from the oscillator 14 is applied via a capacitor 46 and a resistor 48. A resistor 50 is connected between the inverting input of the amplifier 44 and ground to provide a return path for the envelope detected signal from the oscillator 14. The amplifier 44 acts as a difference amplifier; appropriate feed back being applied between the output of the amplifier and the direct input via feed back resistor 52 so as to adjust the gain of the amplifier 44. The output of the amplifier is, therefore, the $\Delta v$ signal which represents the cyclic variations in amplitude in response to the presence of an intruder in accordance with the difference in the amplitude shifts of the RF signals generated by the oscillators 12 and 14. The capacitors 40 and 46 which couple the envelope detected signals provide for the detection of the rate of change of amplitude so as to discriminate against environmental effects (e.g., temperature) upon the circuits.

In the embodiment of the invention shown in FIG. 3, a single oscillator 54 which may be tuned to $F_1$ (e.g., 57.5 $MH_z$) is connected to an antenna 56 by way of a line 58 including a directional coupler 60. The oscillator 54 may be similar in design to the oscillators 12 or 14. The directional coupler 60 includes a diode 62 detector for detecting the envelope of the RF signal picked up by the antenna 56 and, therefore, provides a signal which varies in accordance with the amplitude variations of the rf signals which are caused by the presence and movement of an intruding object in the sensing field established by the antenna 56.

A signal which varies in accordance with the frequency shift of the generated signal due to the intruding object is detected by discriminator 64 which is coupled to the emitter of the transistor $Q_3$ in the oscillator 54. The discriminator provides an output which varies in polarity in accordance with the deviation of the frequency of the oscillator signal about $F_1$. Thus the discriminator 64 produces the $\Delta f$ signal having an amplitude which varies cyclically as shown in FIG. 1 when an intruding object enters or passes through the sensing field.

An operational amplifier 66 has its direct input connected to the diode 62 in the directional coupler 60. The inverting input of the amplifier 66 is connected through a potentiometer 68 to a source of reference voltage indicated at +C for the purpose of reducing the steady state voltage at the output of the amplifier. Accordingly, the output of the operational amplifier will represent the difference between the envelope detected signal from the coupler 60 and the reference voltage. This output voltage will vary cyclically as the intruder enters or passes through the sensing field and corresponds to the $\Delta v$ signal as shown in the dash line in FIG. 1. Capacitors 72 and 74 may be connected between the circuit output and the discriminator 64 and amplifier 66. The $\Delta f$ signal and the $\Delta v$ signal then vary in accordance with the rate of change of the amplitude and frequency shift in the signal generated by the oscillator 54 as the intruding object passes through the sensing field.

As mentioned above, the $\Delta f$ and $\Delta v$ signals are in quadrature phase relationship; and are either 90° out of phase or 270° out of phase depending upon whether the object in the sensing field is moving toward or retreating from the antenna. In order to indicate the presence or direction of movement of the intruding object any of the processing systems shown in FIGS. 4, 5, 7 or 8 may be used. These processing systems also indicate the presence of the intruding object and/or its direction of movement. An electro mechanical processing and indicating system is shown in FIG. 4. A servo motor 80 includes two opposed pairs of windings 82 and 84 which generate a two phase field rotating in accordance with the $\Delta f$ signal, which is applied across the winding 82 and the $\Delta v$ signal which is applied across the winding 84. The rotor 86 of the motor 80 has its shaft 88 connected to an indicator 90. As an intruder advances toward the antenna the indicator needle 90 will turn in one direction, say clockwise, while if the intruder retreats from the antenna the needle will turn counter clockwise. Inasmuch as foliage which moves in response to the wind will sway back and forth, usually a distance of less than 2 feet (it will be recalled that a complete cycle of variation of the signals occurs for movement of 4 feet even at the high end of the VHF band — 120 $MH_z$). Thus, foliage will cause the needle to move back and forth, less than a full turn.

Accordingly, the servo motor effectively correlates the $\Delta f$ and $\Delta v$ signals with each other to produce the rotating field which indicates the presence and direction of movement of the object. The $\Delta f$ and $\Delta v$ signals may suitably be amplified prior to being applied to the coils 82 and 84 of the motor in order to provide sufficient current to establish the rotating magnetic field in the motor. Detection is noted upon series of continuous rotations denoting an approach followed by a series of counter rotations as the intruder leaves.

A processing and indicating system using digital logic is shown in FIG. 5. The $\Delta f$ and $\Delta v$ signals are applied to trigger circuits, such as Schmidt triggers 92 and 94. A source of operating voltage indicated at $V_T$ is applied to the trigger circuits 92 and 94 through potentiometers 96 and 98. Thus, the trigger circuits will be triggered to provide a voltage level of one polarity during the positive cycles of the $\Delta f$ or $\Delta v$ signals applied thereto and of the opposite polarity during the negative cycles of the $\Delta f$ or $\Delta v$ signals, whenever these signals exceed the threshold established by the source at $V_T$ and the potentiometers 96 and 98. The threshold upon the triggering of the circuits 92 and 94 by the signals provides a measure of discrimination against noise. The trigger circuits 92 and 94 have outputs indicated at "1" and "0" which are of opposite polarity depending upon whether the circuits are triggered by positive or negative half cycles of the $\Delta f$ or $\Delta v$ signals. The trigger circuits therefore produce square wave outputs which correspond in phase to the Δf and Δv signals. These outputs are shown by way of example in wave-forms a and in two waveforms b and c in FIG. 6. The first of the waveforms b represents the case where the object in the sensing field is retreating or moving away from the antenna while the other waveform represents the approach of the object toward the antenna. Only the "1" output of the trigger circuits 92 and 94 is indicated; "0" outputs being 180° out of phase. FIG. 6 also shows the quadrature phase relationship of the Δf and Δv signals and that the Δf and Δv signals are 90° out of phase in the retreating mode while 270° out of phase in the approaching mode.

The square wave from the trigger circuit 92 is utilized as a gating signal for pulses produced at the crossovers of the trigger circuit 94 output. These pulses are provided by differentiating circuits indicated by the legend $dv/dt$ 100 and 102 which are connected to the outputs of the trigger circuit 94. Four AND gates 104, 106, 108 and 110 receive gating signals from the "1" and "0" outputs of the trigger circuit 92. Two of the gates 104 and 110 receive pulses from the differentiating circuit 100 and the other two gates 106 and 108 receive pulses from the differentiating circuit 106. The outputs of the AND gates 104 and 106 are coupled through an OR gate to the "up" input of a reversible counter 114. Similarly, the AND gate 108 and 110 outputs are coupled via an OR gate 116 to the down input of the counter 114.

If the intruder approaches, positive going pulses from trigger circuit 94 and differentiator 100 then produce a pulse out of 104. However, if the intruder is retreating, a negative pulse is generated and will not enable gate 104. At the time 104 is enabled, the gate 108 is also enabled. The retreating target produces a positive pulse from the trigger 94 and the gate 102, causing the gate 108 to transmit a pulse. In a similar manner the gates 106 and 110 are enabled. When the gates 104 and 106 are enabled "up" counts may be produced while gates 108 and 110 permit "down" counts to be produced. The "up" count pulses from the gates 104 and 106 are combined in OR gates 112; similarly, "down" count pulses passed by the gates 108 and 110 are combined in OR gate 116.

The pulse train emanating from the OR gate 112 is indicated as the $x$ pulse train while the pulse train emanating from the OR gate 116 is indicated as the $y$ pulse train. It will be appreciated that the gating logic provides pulses in the $x$ pulse train when the object is approaching the antenna (the 270° phase relationship exists) and pulses in the $y$ pulse train when the object is retreating from the antenna (the 90° phase relationship exists). The reversible counter 114 may be suitably designed to provide four to eight stages; thus requiring four to eight counts in the same direction for an alarm output either on its "alarm for approach" output or its "alarm for retreat" output, indicated at 120 and 122 respectively. When noise such as is produced by swaying foliage or other environmental effects causes successive pulses to appear on the up and down inputs of the counter 114, the counter is not able to accumulate sufficient counts so as to produce an alarm. Thus, noise is discriminated against. If, however, an intruder moves through the field so as to produce four to eight successive half cycles, four to eight successive pulses will be gated out either on the $x$ or $y$ pulse trains, thereby producing an alarm indication.

In the event that there are no pulses for a predetermined period of time a timing circuit 124 produces a reset pulse which is applied to the reset input of the counter 114. The timing circuit 124 may be an RC charging circuit which charges to a potential sufficient to produce a reset pulse if the timing circuit is not discharged by a pulse on either the $x$ or $y$ pulse trains as may be applied thereto via an OR-gate 126.

Figure 7:
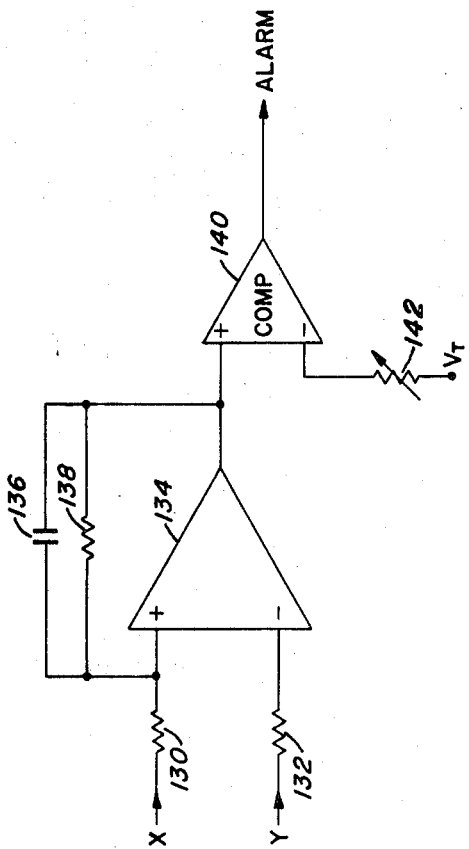
FIG. 7 is a schematic diagram of a portion of a processing circuit which may be used in lieu of the reversible counter circuitry shown in FIG. 6.

Referring to FIG. 7, inputs are shown for the pulse trains $x$ and $y$ through resistors 130 and 132 into the direct and inverting inputs of an operational amplifier 134. An RC feedback circuit from the output to the direct input of this amplifier, consisting of a capacitor 136 and a resistor 138, provides for integration of the difference in the number of pulses in the $x$ and $y$ pulse trains. The resistor 138 discharges the integrator so that if the positive pulses are too slow or cease, the integrator is automatically reset. An alarm is provided by a comparator 140 when the amplitude of the integrated pulse trains exceeds a preset threshold voltage derived from a source indicated at $V_T$ through a potentiometer 142. This alarm indicates the presence of an intruder in the sensing field which is approaching the antenna. If an alarm is desired for intruders retreating from the antenna, another comparator (not shown) wherein the threshold voltage and output of the integrating amplifier 134 are applied to oppositely polarized input terminals from those shown in the case of the comparator 140, may be used. The integrating circuit and comparator 140 therefore may be used in lieu of the reversible counter shown in FIG. 5.

Figure 8:
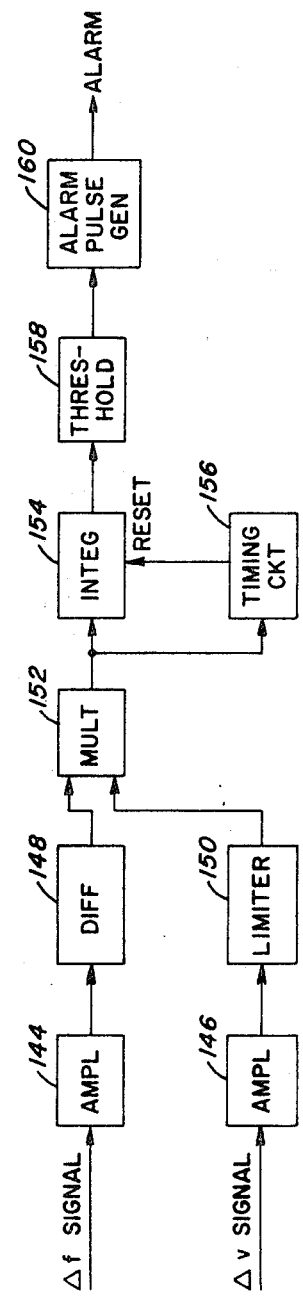
FIG. 8 is a block diagram of a processing system usable with the systems shown in either FIGS. 2 or 3 which is provided in accordance with another embodiment of the invention.

A cross correlation processor in accordance with another embodiment of the invention is shown in FIG. 8. The Δf and Δv signals as may be obtained from the systems shown in FIGS. 2 or 3 are amplified in amplifiers 144 and 146. One of the amplified Δf or Δv signals is differentiated in a differentiating circuit while the other is hard limited in a limiter circuit. In FIG. 8 a differentiating circuit 148 is connected to the output of the amplifier 144 while the limiter is connected to the amplifier 146. The differentiating circuit shifts the Δf phase 90°, now causing Δf and Δv to be in or out of phase depending upon approach or retreat. It will be appreciated that the connections of these circuits 148 and 150 may be reversed. The correlation of the differentiated and limited signal is accomplished in a multiplier 152 which may be a sampling circuit whereby a pulse is produced having a polarity which is a function of the direction of the object, say positive if the object is approaching the antenna or negative if it is retreating from the antenna. The pulse has an amplitude which is a function of the rate of travel or speed of the object. The foregoing pulse sign and amplitude relationships are due to the 90° phase shift of the Δf and Δv signals when the object is approaching the antenna and the 270° or out of phase relationship of the signals when the intruding object is retreating from the antenna.

The product signal from the multiplier is integrated to form an output suitable for thresholding for alarm detection. Thus, the multiplier 152 is connected to an integrator circuit 154 which may be similar to the integrator circuit shown in FIG. 7 except that the inverting input of the amplifier 154 would be grounded. A reset circuit may be provided for discharging the capacitor in the integrator if an output pulse from the multiplier 152 is not produced within a given period of time, say 4 to 8 seconds. This reset function is provided by timing circuit 156 which may be similar to the circuit 124 shown in FIG. 5. The integrated output is applied to a threshold circuit 158 which may be a comparator circuit such as the comparator 140 supplied with a threshold voltage through a potentiometer 142, as shown in FIG. 7. When the threshold circuit provides an output level this level may be translated into a pulse by an alarm pulse generator 160, such as a one shot multivibrator which provides an alarm output for triggering a relay which turns on a lamp or othersie provides an automatic alarm response function. The system shown in FIG. 8 will provide an alarm of one type notwithstanding the direction of movement of the object. In the event that alarms indicative of the direction of movement are desired another threshold circuit and alarm pulse generator which are responsive to integrated outputs of opposite polarity may be utilized.

From the foregoing description it will be apparent that there has been provided an improved intrusion detection system. Although various embodiments of the system and processing circuitry therefor have been described, it will be appreciated that variations and modifications in the herein described system within the scope of the invention will become apparent to those skilled in the art. Accordingly, the foregoing description should be taken merely as illustrative and not in any limiting sense.

What is claimed is:
1. An intrusion detection system which comprises
 a. an antenna for establishing a sensing field,
 b. electromagnetic signal generating means operative to generate signals at a given frequency,
 c. said generating means being coupled to said antenna for exciting said antenna with said signals to radiate said sensing field,
 d. means responsive to variations in the frequency of said signals to produce a first output which varies cyclically in amplitude as an object in said field approaches or retreats from said antenna,
 e. means responsive to variations in the amplitude of said signals to produce a second output in quadrature phase relationship with said first output and which varies cyclically when the object approaches said antenna and when the object retreats from said antenna, said second output produced when said object approaches said antenna being approximately 180° out of phase with said second output produced when said object retreats from said antenna, and
 f. means for correlating said first and second outputs with each other to indicate the presence and direction of movement of said object with respect to said antenna.

2. The invention as set forth in claim 1 wherein said correlating means includes electromechanical phase indicator having a movable element and drive means for said element operated by said first and second outputs.

3. The invention as set forth in claim 2 wherein said indicator includes a servo motor, said movable element being the shaft of said motor, and said drive means being the stator winding of said motor.

4. The invention as set forth in claim 3 wherein said motor is a two-phase servo motor and wherein said first output is applied to the stator winding for one of said phases and said second output is applied to the stator winding for the other of said phases.

5. The invention as set forth in claim 1 wherein said generating means is an oscillator tuned to said given frequency and connected to said antenna.

6. The invention as set forth in claim 5 wherein said frequency variation responsive means is a frequency discriminator coupled to said oscillator.

7. The invention as set forth in claim 6 including a capacitor coupled to the output of said discriminator.

8. The invention as set forth in claim 1 wherein said amplitude variation responsive means comprises a directional coupler connected in a line between said generating means and said antenna.

9. The invention as set forth in claim 8 wherein said amplitude variation responsive means further comprises a detector connected to the output of said directional coupler, and means for providing an output voltage corresponding to the difference between the output voltage from said detector and a reference voltage.

10. The invention as set forth in claim 9 wherein said output voltage providing means is a differential amplifier, and a capacitor connected to the output of said differential amplifier for producing said second output.

11. The invention as set forth in claim 1 wherein said correlating means includes means for integrating the difference between said first and second outputs and for producing an alarm signal when said integrated difference exceeds a certain threshold amplitude.

12. The invention as set forth in claim 1 wherein said integrating means includes an operational amplifier having direct and inverting inputs to which said first and second outputs are applied, and an RC network connected in feedback relationship between the output of said amplifier and one of said direct and inverting inputs.

13. The invention as set forth in claim 1 wherein said correlating means comprises means for integrating the product of said first and second outputs, and means for providing an alarm output when said integrated product exceeds a certain threshold.

14. The invention as set forth in claim 13 wherein said means for integrating the product comprises means of said outputs for translating at least one of said first and second outputs into a square wave signal, means for differentiating the other of said first and second outputs, means for sampling said square wave signal with said differentiated output, and means for integrating the output of said last named means.

15. The invention as set forth in claim 14 wherein said integrating means is a counter.

16. The invention as set forth in claim 1 wherein said correlating means comprises a reversible counter having upcount and down-count input for producing an alarm output when the difference between the number of pulses applied to different ones of said inputs exceeds a certain number, and pulse generating logic means responsive to said first and second outputs having first and second output terminals connected to said up and down count inputs, respectively, for producing pulses at said first terminals when said object advances toward said antenna and at said second terminal when said object retreats from said antenna.

17. The invention as set forth in claim 16 wherein said pulse generating logic included means for translating said first and second outputs into pairs of square waves of opposite polarity, means for differentiating the pair square waves corresponding to one of said first and second outputs, means for gating said square waves corresponding to the other of said first and second outputs each with a different one of said differentiated square waves to produce two pairs of output pulses, and means for applying different pairs of said output pulses separately to said up-count input and to said down-count input.

18. An intrusion detection system which comprises
  a. an antenna for establishing a sensing field,
  b. first and second signal generating means each producing signals at different frequencies separatee by a certain difference frequency,
  c. means coupling said generating means to said antenna for exciting said antenna at both of said different frequencies,
  d. means responsive to variations in said difference frequency to produce a first output which varies cyclically in amplitude in accordance with variations in said difference frequency in response to the movement of an object in said sensing field with respect to said antenna,
  e. means responsive to the difference in amplitude of the signals produced by said first and second generating means to produce a second output which varies cyclically and in quadrature phase relationship with said first output as said object moves with respect to said antenna in said sensing field, and
  f. means for correlating said first and second outputs to indicate the presence and direction of movement of said object with respect to said antenna.

19. The invention as set forth in claim 18 wherein said first and second generating means are first and second oscillators each tuned to a different frequency, a filter connected to one of said oscillators for passing said difference frequency signal, a discriminator connected to said filter to provide said first output means connected to said first and second oscillators to derive signals varying in amplitude in accordance with the variations in amplitude of the envelope of said different frequency signals, and a differential amplifier to which said last named signals are applied for providing said second output.

20. The invention as set forth in claim 18 wherein said correlating means includes electromechanical phase indicator having a movable element and drive means for said element operated by said first and second outputs.

21. The invention as set forth in claim 20 wherein said indicator includes servo motor, said movable element being the shaft of said motor, and said means being the stator winding of said motor.

22. The invention as set forth in claim 21 wherein said motor is a two-phase servo motor and wherein said first output is applied to the stator winding for one of said phases and said second output is applied to the stator winding for the other of said phases.

23. The invention as set forth in claim 18 wherein said first and second generating means are separate oscillators each to a separate one of said different frequencies.

24. The invention as set forth in claim 23 wherein said frequency variation responsive means is a frequency discriminator coupled to said oscillator.

25. The invention as set forth in claim 24 including a capacitor coupled to the output of said discriminator.

26. The invention as set forth in claim 18 wherein said correlating means includes means for integrating the difference between said first and second outputs and for producing an alarm signal when said integrated difference exceeds a certain threshold amplitude.

27. The invention as set forth in claim 26 wherein said integrating means includes an operational amplifier having direct and inverting inputs to which said first and second outputs are applied, and an RC network connected in feedback relationship between the output of said amplifier and one of said direct and inverting inputs.

28. The invention as set forth in claim 18 wherein said correlating means comprises means for integrating the product of said first and second outputs, and means for providing an alarm output when said integrated product exceeds a certain threshold.

29. The invention as set forth in claim 28 wherein said means for integrating the product comprises means of said outputs for translating at least one of said first and second outputs into a square wave signal, means for differentiating the other of said first and second outputs, means for sampling said square wave signal with said differentiated output, and means for integrating the output of said last named means.

30. The invention as set forth in claim 29 wherein said integrating means is a counter.

31. The invention as set forth in claim 18 wherein said correlating means comprises a reversible counter having upcount and down-count input for producing an alarm output when the difference between the number of pulses applied to different ones of said inputs exceeds a certain number, and pulse generating logic means responsive to said first and second outputs having first and second output terminals connected to said up and down count inputs, respectively, for producing pulses at said first terminals when said object advances toward said antenna and at said second terminal when said object retreats from said antenna.

32. The invention as set forth in claim 31 wherein said pulse generating logic included means for translating said first and second outputs into pairs of square waves of opposite polarity, means for differentiating the pair of square waves corresponding to one of said first and second outputs, means for gating said square waves corresponding to the other of said first and second outputs each with a different one of said differentiated square waves to produce two pairs of output pulses, and means for applying different pairs of said output pulses separately to said up-count input and to said down-count input.

* * * * *